United States Patent
Pan et al.

(10) Patent No.: US 9,909,925 B2
(45) Date of Patent: Mar. 6, 2018

(54) APPARATUS AND METHOD TO MEASURE TEMPERATURE OF 3D SEMICONDUCTOR STRUCTURES VIA LASER DIFFRACTION

(71) Applicants: Heng Pan, Santa Clara, CA (US); Matthew Scott Rogers, Mountain View, CA (US); Aaron Muir Hunter, Santa Cruz, CA (US); Stephen Moffatt, St. Brelade (JE)

(72) Inventors: Heng Pan, Santa Clara, CA (US); Matthew Scott Rogers, Mountain View, CA (US); Aaron Muir Hunter, Santa Cruz, CA (US); Stephen Moffatt, St. Brelade (JE)

(73) Assignee: APPLIED MATERIALS, INC., Santa Clara ( * ) Notice: Subject to any disclaimer, the term of this patent is extended or adjusted under 35 U.S.C. 154(b) by 1348 days.

(21) Appl. No.: 13/672,117

(22) Filed: Nov. 8, 2012

(65) Prior Publication Data

US 2013/0120737 A1 May 16, 2013

Related U.S. Application Data

(60) Provisional application No. 61/558,309, filed on Nov. 10, 2011.

(51) Int. Cl.
*G01J 5/00* (2006.01)
*G01J 5/32* (2006.01)
*G01J 5/08* (2006.01)

(52) U.S. Cl.
CPC ............... *G01J 5/08* (2013.01); *G01J 5/0007* (2013.01); *G01J 5/0803* (2013.01); *G01J 2005/0074* (2013.01); *G01J 2005/0077* (2013.01)

(58) Field of Classification Search
CPC ................... G01J 5/00; G01J 5/08; G01J 5/32
(Continued)

(56) References Cited

U.S. PATENT DOCUMENTS 4,956,538 A * 9/1990 Moslehi ............... G01J 5/0003
219/121.6
5,162,660 A * 11/1992 Popil .................... G01B 11/303
250/225

(Continued)

FOREIGN PATENT DOCUMENTS

CN 1662789 A 8/2005
JP 05-320917 A 12/1993
(Continued)

OTHER PUBLICATIONS

International Search Report and Written Opinion for PCT/US2012/064153 dated Mar. 26, 2013.

(Continued)

*Primary Examiner* — Gail Kaplan Verbitsky
(74) *Attorney, Agent, or Firm* — Patterson + Sheridan LLP

(57) ABSTRACT

Embodiments of the present invention generally relate to apparatus for and methods of measuring and monitoring the temperature of a substrate having a 3D feature thereon. The apparatus include a light source for irradiating a substrate having a 3D feature thereon, a focus lens for gathering and focusing reflected light, and an emissometer for detecting the emissivity of the focused reflected light. The apparatus may also include a beam splitter and an imaging device. The imaging device provides a magnified image of the diffraction pattern of the reflected light. The method includes irradiating a substrate having a 3D feature thereon with light, and focusing reflected light with a focusing lens. The focused light is then directed to a sensor and the emissivity of the substrate is measured. The reflected light may also (Continued)

impinge upon an imaging device to generate a magnified image of the diffraction pattern of the reflected light.

9 Claims, 5 Drawing Sheets

(58) Field of Classification Search
USPC .............................. 356/43; 385/12; 438/16
See application file for complete search history.

(56) References Cited

U.S. PATENT DOCUMENTS

| | | | | |
|---|---|---|---|---|
| 5,293,214 | A * | 3/1994 | Ledger | G01B 11/0625 356/504 |
| 5,564,830 | A * | 10/1996 | Bobel et al. | 374/126 |
| 6,183,127 | B1 * | 2/2001 | Hebb et al. | 374/9 |
| 6,190,040 | B1 * | 2/2001 | Renken et al. | 374/185 |
| 6,200,023 | B1 * | 3/2001 | Tay et al. | 374/161 |
| 6,265,696 | B1 * | 7/2001 | Sakurai | G01J 5/0003 118/724 |
| 6,479,801 | B1 * | 11/2002 | Shigeoka | G01J 5/0003 219/497 |
| 8,696,197 | B2 * | 4/2014 | Timans | 374/130 |
| 2001/0006530 | A1 * | 7/2001 | Adams et al. | 374/131 |
| 2004/0164221 | A1 * | 8/2004 | Gelman | 250/201.2 |
| 2006/0032433 | A1 | 2/2006 | Sakata | |
| 2008/0082288 | A1 * | 4/2008 | Raad | 702/130 |
| 2008/0259357 | A1 * | 10/2008 | Bischoff | G01N 21/4788 356/625 |
| 2009/0200279 | A1 * | 8/2009 | Li | 219/121.66 |
| 2011/0027918 | A1 * | 2/2011 | Tanaka | 438/16 |
| 2012/0025741 | A1 * | 2/2012 | Morita | H01J 37/026 315/506 |
| 2012/0100640 | A1 * | 4/2012 | Anikitchev et al. | 438/7 |
| 2015/0053659 | A1 * | 2/2015 | Jennings et al. | 219/121.76 |

FOREIGN PATENT DOCUMENTS

| | | |
|---|---|---|
| JP | 2001-249050 A | 9/2001 |
| JP | 2007-040981 A | 2/2007 |
| JP | 2007-271399 A | 10/2007 |
| KR | 10-0195211 B1 | 6/1999 |
| KR | 2004-0085267 A | 10/2004 |

OTHER PUBLICATIONS

Chinese Office Action dated Feb. 3, 2016 for Application No. 201280051151.9.
Chinese Office Action dated Sep. 23, 2016 for Application No. 201280051151.9.

* cited by examiner

APPARATUS AND METHOD TO MEASURE TEMPERATURE OF 3D SEMICONDUCTOR STRUCTURES VIA LASER DIFFRACTION

CROSS-REFERENCE TO RELATED APPLICATIONS

This application claims benefit of U.S. Provisional Patent Application Ser. No. 61/558,309, filed Nov. 10, 2011, which is herein incorporated by reference.

BACKGROUND OF THE INVENTION

Field of the Invention

Embodiments of the invention generally relate to apparatus and methods for measuring the temperature of substrates having three-dimensional (3D) features thereon.

Description of the Related Art

The drive for continued scaling of semiconductor devices results in new architectures for semiconductor devices, including 3D features. One consequence of 3D features is a reduction in the accuracy of non-contact metrology due to the loss of specular reflection (e.g., when the incident angle of an irradiating light source is equal to the angle of reflection) due to the decreased collection of light by a detector. Non-contact metrology, such as pyrometry, can be used to determine substrate temperature by measuring the thermal radiation emitting from an object. The thermal emission of a substrate can be expressed as:

$$v(T) = \frac{R_\Omega A}{\pi} \int_{\lambda 2}^{\lambda 1} \int_{\phi 2}^{\phi 1} \int_{\theta 2}^{\theta 1} \varepsilon'_\lambda(\lambda, \theta, \phi, T) \tau(\lambda) XG(\lambda) e_{\lambda,b}(\lambda, T) d\theta d\phi d\lambda \quad \text{(Equation 1)}$$

where T is temperature; $\theta$ and $\phi$ are the polar and azimuthal angles; $\lambda$ is light wavelength; $R_\Omega$ is the impedance of an oscilloscope; A is the area sensed by a detector; $\varepsilon'_\lambda(\lambda, \theta, \phi, T)$ is the directional spectral emissivity; $\tau$ ($\lambda$) is the spectral transmittance of the lenses and filter in the optical path; $G(\lambda)$ is the responsivity of the detector at different wavelengths, and $e_{\lambda,b}$ is the emissivity of the substrate. As shown in Equation 1, the thermal emission of a substrate is a function of both emissivity and temperature of the substrate. To simplify the above equation, most optical pyrometers are set to a single emissivity value, regardless of the object measured. However, not all objects have the same emissivity, and therefore, the temperature derived by the pyrometer is frequently inaccurate.

For some planar structures, the emissivity of an object can be experimentally determined allowing for a correction factor to be applied to the pyrometer, which facilitates a more accurate determination of object temperature. Non-contact metrology is particularly inaccurate when processing 3D structures as compared to planar substrates. The metrology of 3D structures is even less accurate due to difficulties in determining object emissivity. Irradiation of a 3D structure results in scattering and interference of light reflected from the substrate, making emissivity determination inaccurate when utilizing conventional emissivity measurement techniques.

Therefore, there is a need for a method of and apparatus for measuring and monitoring the temperature of a substrate having a 3D feature thereon.

SUMMARY OF THE INVENTION

Embodiments of the present invention generally relate to apparatus for and methods of measuring and monitoring the temperature of a substrate having a 3D feature thereon. The apparatus include a light source for irradiating a substrate having a 3D feature thereon, a focus lens for gathering and focusing light reflected from the substrate, and an emissometer for detecting the emissivity of the focused reflected light. The apparatus may also include a beam splitter to split light reflected from the substrate towards the emissometer as well as an imaging device. The imaging device provides a magnified image of the diffraction pattern of the reflected light. The method includes irradiating a substrate having a 3D feature thereon with light from a light source, reflecting the light off of the substrate, and focusing the reflected light with a focusing lens. The focused light is then directed to a sensor and the emissivity of the substrate is measured. The reflected light may also impinge upon an imaging device to generate a magnified image of the diffraction pattern of the reflected light.

In one embodiment, an apparatus comprises a chamber body having a substrate support positioned therein. A reflection measurement system is positioned within the chamber body and includes a light source positioned to direct light towards a substrate supporting surface of the substrate support and a focus lens positioned to collect light reflected from the surface of a substrate placed on the substrate supporting surface. The reflection measurement system also includes a beam splitter positioned to direct a first portion of the light collected by the focus lens to an emissometer which determines an emissivity of the substrate, and to direct a second portion of the light collected by the focus lens to an imaging device. The apparatus also includes a processing unit to determine a temperature of the substrate based upon the emissivity of the substrate.

In another embodiment, a method of determining the temperature of a substrate comprises positioning a substrate having a 3D feature thereon on a substrate support within a chamber body. Light from a light source is directed to and reflected from a surface of the substrate. The reflected light is collected with a focus lens, and directed to an emissometer. An emissivity of the substrate is determined, and then a temperature of the substrate is determined based upon the emissivity of the substrate.

In another embodiment, a method of determining the temperature of a substrate comprises positioning a substrate having a 3D feature thereon on a substrate support within a chamber body. Light from a light source is directed to and reflected from a surface of the substrate. The reflected light is collected with a focus lens and directed to a beam splitter. The beam splitter splits the reflected light into first and second paths. The first path is directed towards an emissometer and the second path is directed towards an imaging device. An emissivity of the substrate is determined, and then a temperature of the substrate is determined based upon the emissivity of the substrate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present invention generally relate to apparatus for and methods of measuring and monitoring the temperature of a substrate having a 3D feature thereon. The apparatus include a light source for irradiating a substrate having a 3D feature thereon, a focus lens for gathering and focusing light reflected from the substrate, and an emissometer for detecting the emissivity of the focused reflected light. The apparatus may also include a beam splitter to split light reflected from the substrate towards the emissometer as well as an imaging device. The imaging device provides a magnified image of the diffraction pattern of the reflected light. The method includes irradiating a substrate having a 3D feature thereon with light from a light source, reflecting the light off of the substrate, and focusing the reflected light with a focusing lens. The focused light is then directed to a sensor and the emissivity of the substrate is measured. The reflected light may also impinge upon an imaging device to generate a magnified image of the diffraction pattern of the reflected light.

Figure 1:
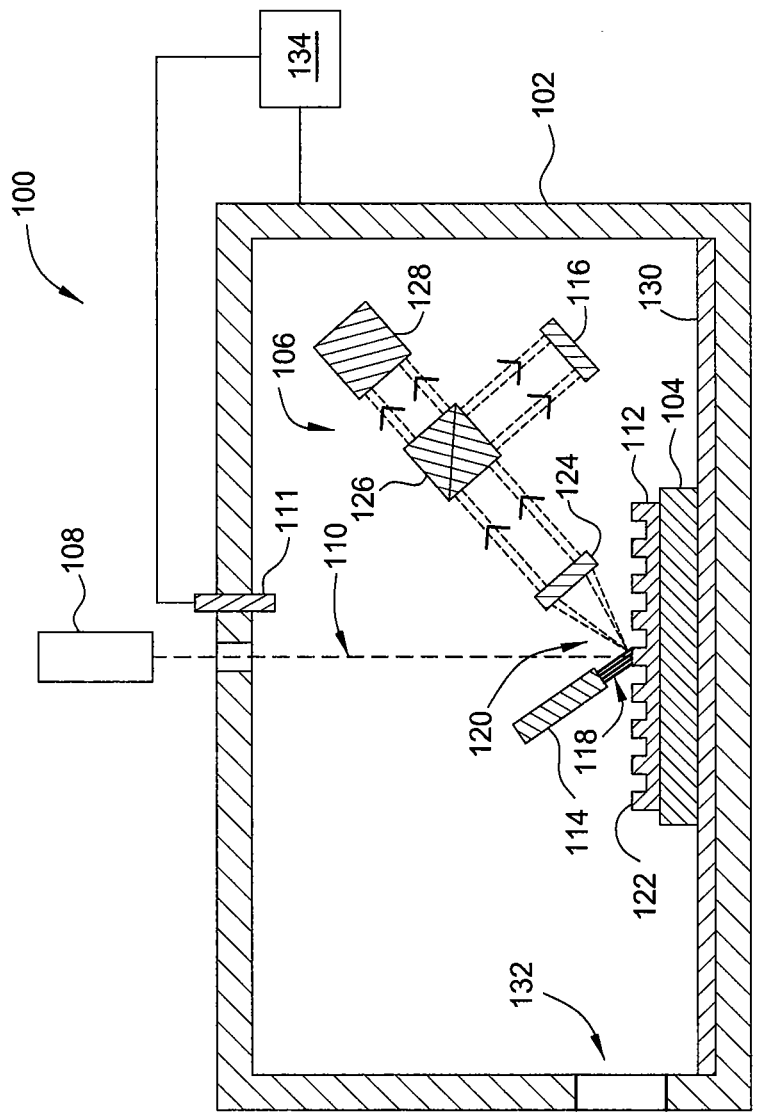
FIG. 1 illustrates a processing chamber according to one embodiment of the invention.

FIG. 1 illustrates a processing chamber 100 according to one embodiment of the invention. The processing chamber 100 includes a chamber body 102, a substrate support 104, and a reflection measurement system 106. A laser 108 is disposed outside the chamber body 102 above the substrate support 104 and is adapted to direct light 110 to a surface of a substrate 112 positioned on the substrate support 104. The laser 108 delivers the light 110 to the substrate 112 to facilitate thermal processing of the substrate 112, such as thermal annealing, dopant activation, or recrystallization. A pyrometer 111 is positioned adjacent to the laser 108 and is directed at the substrate 112 to measure thermal radiation emitted from the substrate 112.

The reflection measurement system 106 is positioned within the chamber body 102 in a fixed location. The reflection measurement system 106 facilitates temperature measurement of the substrate 112 prior to, during or subsequent to thermal processing of the substrate 112. The reflection measurement system 106 allows the emissivity of the substrate 112 to be determined by measuring the amount of light reflected from the substrate 112. The reflection measurement system 106 is adapted to direct light 118 from a light source 114 towards the surface of the substrate 112, and measure the amount of reflected light 120 reflected off of the surface of the substrate 112 via a sensor 116, such as an emissometer. The light source 114 is generally a monochromatic light source which generates the light 118 and is positioned at a known angle relative to the substrate for example, about zero degrees to about 60 degrees. Since the light 118 is of a single wavelength, interference of the light 118 is negligible, and any interference of the reflected light 120 can be attributed to the 3D structures 122 located on the surface of the substrate 112. Additionally, the light source 114 is adapted to generate light at a different wavelength than the laser 108 so that a sensor 116 can distinguish light 118 the light 110 which may be reflected from the substrate 112. Generally, most or all of the light 110 is absorbed by the substrate, however, in the event some of the light 110 is reflected from the substrate 112, the utilization of different wavelengths for lights 110 and 118 facilitates accurate emissivity determination.

The reflection measurement system 106 also includes a focus lens 124 positioned at a fixed location within the chamber body 102. The center of the focus lens 124 is positioned approximately at a specular angle of reflection to collect and focus the reflected light 120. The focus lens 124 may be positioned about 10 millimeters to about 20 millimeters from the substrate 112. The focus lens 124 is formed from glass, however, it is contemplated at the focus lens 124 may also be formed from plastics suitable to withstand the thermal annealing environment within the processing chamber 100. The focus lens facilitates the collection of reflected light which would otherwise fall outside of the sensing area of the sensor 116 (e.g., high order reflections, or reflections which deviate from a specular reflection). A beam splitter 126 is positioned adjacent to the focus lens 124 on the side opposite the substrate 112. The beam splitter 126 is an optical device positioned at or near the back focal plane of the focus lens 124 and is adapted to split the focused reflected light 120 into two directions. As illustrated in FIG. 1, the reflected light 120 is split into two perpendicular directions. The beam splitter 126 may be formed from two triangular glass prisms adhered to one another by a resin to form a quadrilateral. The resin composition and thickness may be selected to divert a predetermined fraction of the incoming reflected light 120 to the sensor 116, while allowing a second fraction, such as the remaining fraction, of the incoming reflected light 120 to pass to an imaging device 128, such as a CCD camera. The imaging device 128 is positioned adjacent to the beam splitter 126 and shares a common axis with the focus lens 124 and the beam splitter 126. The imaging device 128 is positioned at the first focal plane, and is adapted to receive incoming light and generate a magnified image of the diffraction pattern of the reflected light 120. The diffraction pattern corresponds to the periodicity of the 3D structures 122 on the substrate surface, and thus, provides information relating to the size, shape, and spacing (and changes thereto) of the 3D structures 122.

The substrate support 104 is positioned on a chamber bottom 130. The substrate support 104 is translatable in the X-Y directions relative to the reflection measurement system 106 along the chamber bottom 130 in order to position unprocessed portions of the substrate 112 to receive light 110 from the laser 108. The substrate support 104 is movable to a position clear of the reflection measurement system 106 to allow for the substrate 112 to be placed upon or removed from the substrate support 104 through a slit valve 132 via a robot (not shown). Lift pins (not shown) may be disposed through the substrate support 104 to facilitate removal of the substrate 112 from the substrate support 104. A processing unit 134, such as a computer, is coupled to the processing chamber 100 and is adapted to control processes therein, including exposure of the substrate 112 to the light 110 or 118, loading and unloading of substrates, and determination of substrate temperature.

During operation of the processing chamber 100, such as during a thermal annealing process, the light source 114 irradiates the substrate 112 with a known amount of light 118 (e.g., a known energy per unit area) at a predetermined wavelength. Some of the light 118 is absorbed by the substrate 112 while the remainder is reflected off of the substrate 112 (and scatters) as reflected light 120. The reflected light 120 is then collected and focused by the focus lens 124. Even though the reflected light 120 experiences scattering, the focus lens 124 facilitates collection of a majority, or all, of the reflected light. Since most or all of the reflected light is collected, a more accurate measurement of substrate emissivity can be made.

The focus lens 124 focuses the reflected light 120 onto the beam splitter 126, which directs a known fraction of the reflected light 120 to the sensor 116. The sensor 116, which is in communication with the processing unit 134, measures the amount of reflected light 120. The amount of reflected light 120 can be accurately determined because the fraction of light diverted by the beam splitter 126 is known due to the known properties of the resin used to form the beam splitter 126. From the measured reflectivity, the sensor 116 determines the emissivity of the substrate 112 as approximately one minus the reflectivity. Having determined the emissivity of the substrate 112, the temperature of the substrate 112 can then be accurately determined by the processing unit 134 using Equation 1 and the Planck Distribution Equation (Equation 2).

$$e_{\lambda,b} = \frac{2\pi C_1}{\lambda^5 e^{(C_2/\lambda T)} - 1}$$ (Equation 2)

Equation 2 allows for correction of the emissivity of the substrate when determining the thermal radiation emitted from the substrate 112 by the pyrometer 111. Equation 2 can be substituted into Equation 1 to yield an accurate temperature measurement during measurement of the thermal radiation emitted from the substrate. In Equation 2, $e_{\lambda,b}$ is the emissivity of the substrate as determined by the emissometer and the processing unit 134; $C_1$ is a constant which equals $3.74 \times 10^{-16}$ W m$^{-2}$; $C_2$ is a constant which equals $1.44 \times 10^{-2}$ m K; $\lambda$ is the wavelength or the light emitted from the light source 114; and T is the temperature of the substrate. Thus accurate determination of the substrate emissivity facilitates accurate determination of the substrate temperature by the pyrometer via emissivity-corrected pyrometry.

While the processing chamber 100 is adapted for thermal processing of the substrate 112, it is contemplated that the reflection measurement system 106 may be utilized in other processing chambers, such as atomic layer deposition (ALD) chambers or other process chambers. When the reflection measurement system 106 is positioned within an ALD chamber, it is desirable to position the reflection measurement system 106 in a location which mitigates deposition of material on the focus lens 124. A process gas, such as an inert gas, may be utilized to direct deposition material or precursor gases away from the focus lens 124 during ALD processing.

Figure 2:
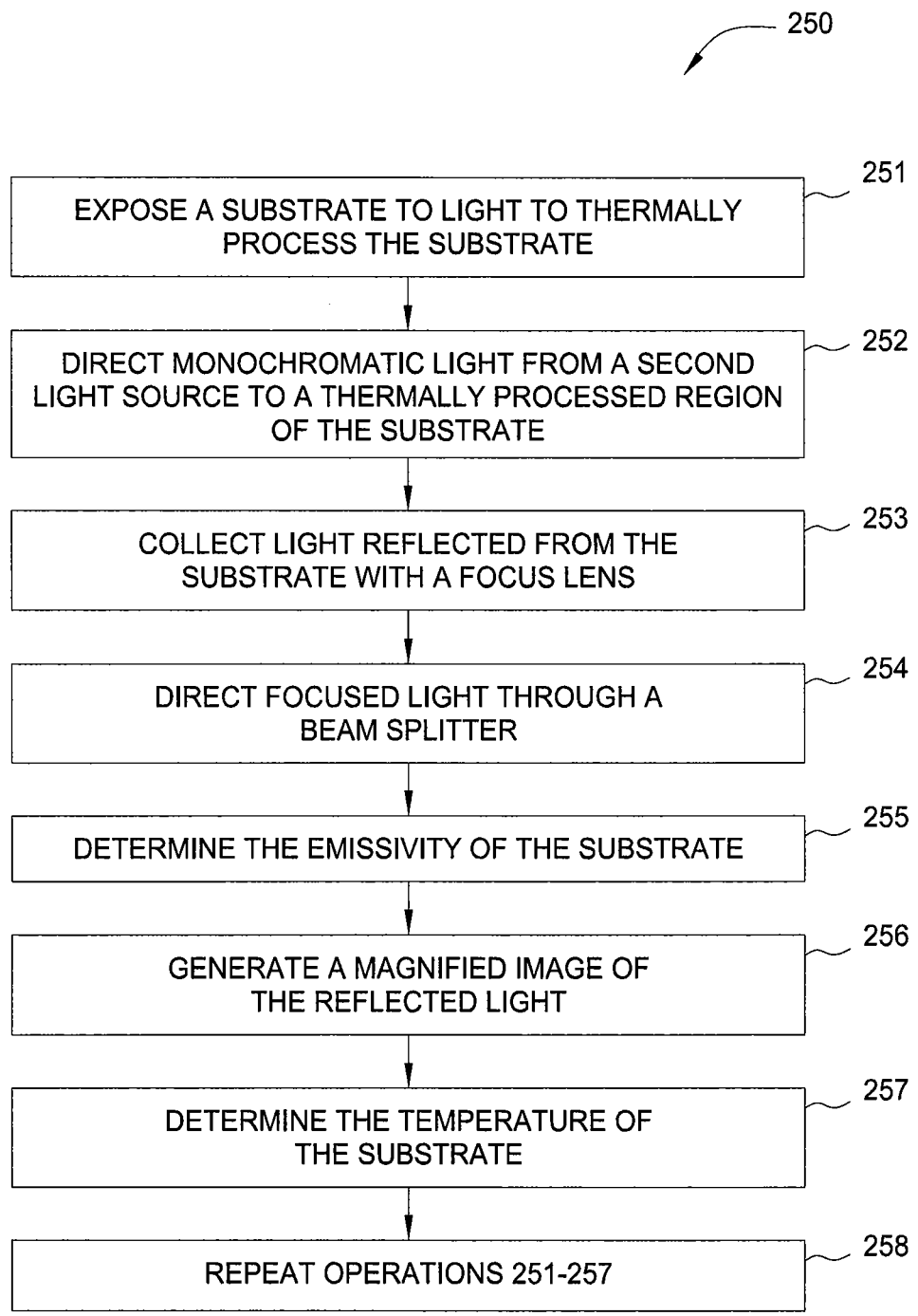
FIG. 2 illustrates a flow diagram of a method of determining substrate temperature according to one embodiment of the invention.

FIG. 2 illustrates a flow diagram 250 for a method of determining substrate temperature according to one embodiment of the invention. Flow diagram 250 begins at operation 251, in which a substrate having a 3D structure thereon is exposed to light from a laser to thermally process the substrate. In operation 252, while continuing to thermally process the substrate, monochromatic light from a second light source is directed to and reflected from a thermally processed region of the substrate. In operation 253, the light from the monochromatic light source which is reflected form the substrate surface is collected and focused by a focus lens. The focus lens is sufficiently sized and positioned sufficiently close to the substrate to collect a desired amount of reflected light; for example, at least about 90 percent or about 100 percent of the light reflected from the substrate.

In operation 254, the reflected light is directed to a beam splitter by the focus lens. The beam splitter splits the focused light into two paths. A first path is directed to a sensor, which determines the emissivity of the substrate based upon the amount of light reflected from the substrate in operation 255. The second path of the beam splitter directs the reflected light to a CCD camera which collects the reflected light to generate a magnified image of the diffraction pattern of the reflected light in operation 256. The magnified image of the diffraction pattern allows the periodicity of the 3D features to be determined, and also provides information relating to the amount of scattering and the specular angle of the reflected light. The diffraction pattern can be utilized to monitor the size and spacing of the 3D features during processing, and may be used to indicate faulty devices or substrates which do not meet predetermined quality specifications.

In operation 257, the temperature of the substrate can be determined once the emissivity has been determined in operation 255. The temperature of the substrate can be determined using an emissivity-corrected pyrometer which measures the thermal radiation emitted from the substrate. In operation 258, operations 251-257 may be repeated. Repetition of operations 251-257 allows for the temperature of the substrate to be monitored over a desired period of time. Monitoring of the substrate temperature allows for endpoint identification during thermal processing, as well as time-dependent thermal mapping of the substrate, such as deriving a monitoring a temperature history of the substrate. A temperature history of the substrate allows for an accurate temperature determination at a given processing period of the substrate, and allows an accurate determination of the total amount of thermal energy delivered to a substrate during processing. For growth processes, a temperature history can be used to determine the temperature of the substrate with respect to the change in size of 3D structures thereon.

Flow diagram 250 illustrates one embodiment of determining substrate temperature; however, other embodiments are also contemplated. In another embodiment, it is contemplated that operation 251 may occur prior to or subsequent to, rather than concurrently with, operation 252. In another embodiment, it is contemplated that operation 251 may be replaced with an atomic layer deposition process; for example, an epitaxial growth process. In such an embodiment, the magnified image of the reflected light in operation 256 may be utilized to monitor and determine formation rates of 3D features on the substrate. The magnified image can also be utilized to form a 3D representation of temperature versus time versus feature size for the formation of the 3D structure, which can be utilized to facilitate in situ process control. In yet another embodiment, it is contemplated that in instances where the focus lens is not large enough to capture all of the reflected light, the processing unit may compensate for the uncollected portion of light by applying a correction factor. The correction factor applied by the processing unit may be a predetermined value (e.g., 3 percent, 5 percent, or 10 percent), or may be calculated based on characteristics, such as the intensity distribution of each mode collected, of the magnified image of the interference of the reflected light.

Figure 3:
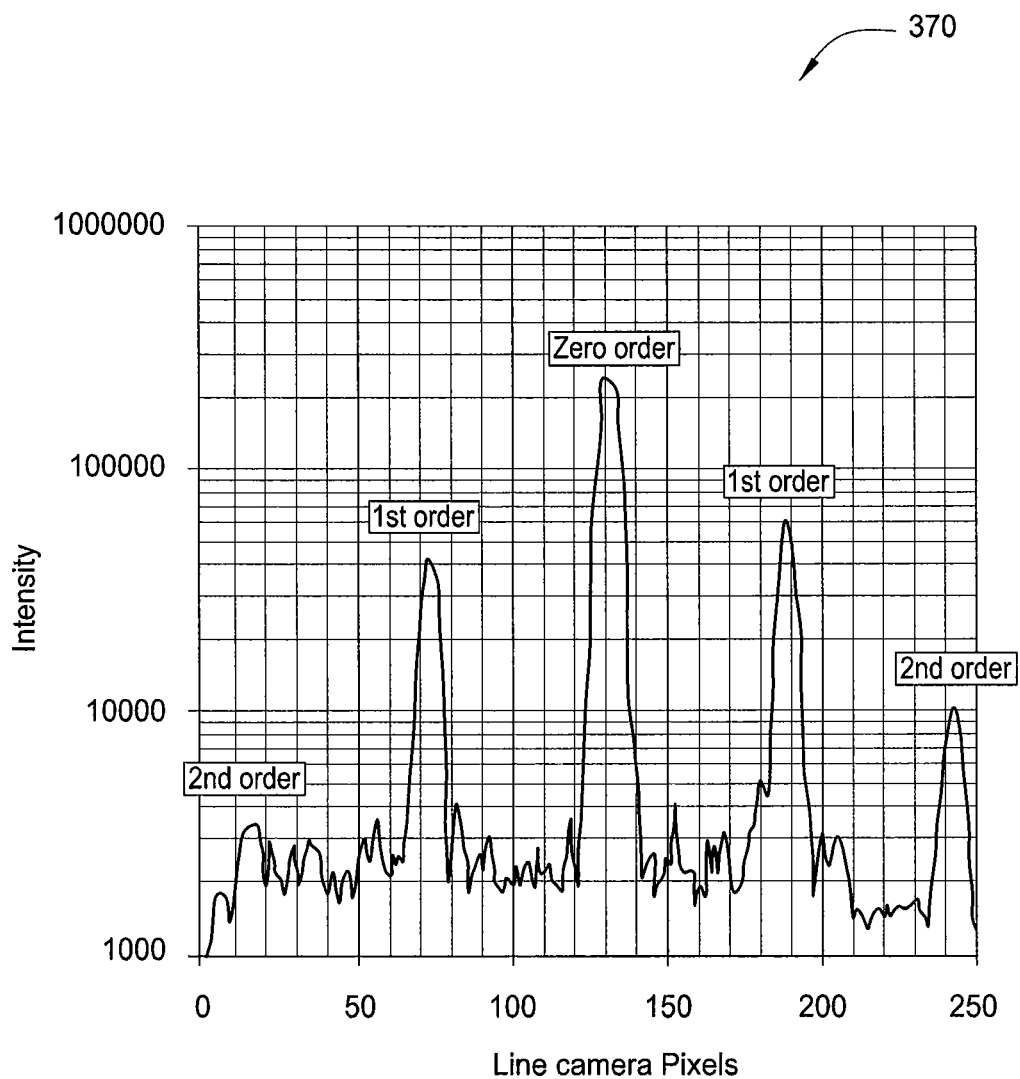
FIG. 3 illustrates an exemplary diffraction pattern captured using embodiments of the invention.

FIG. 3 illustrates an exemplary diffraction pattern 370 captured using embodiments of the invention. The diffraction pattern 370 was captured using a process chamber similar to that shown in FIG. 1. The diffraction data is collected from a substrate having a plurality of 0.16 micrometer wide trenches on a surface thereof spaced about 2 micrometers apart from one another. The diffraction pattern includes a zero order reflection (e.g., specular reflection), two first order reflections caused by the trenches on the substrate, and two second order reflections caused by the trenches of the substrate. As the order of the reflections increases, the angle of deviation from specular reflection likewise increases. It is to be noted that if the first, second, or higher order reflections are not captured for metrology purposes, for example, using the apparatus shown in FIG. 1, then the measurements, such as emissivity measurements, derived using the reflection data are inaccurate do to the incomplete collection of reflection data. For example, the first order reflections of the diffraction pattern 370 represent a sizeable portion of the collected reflection. Omission of the first order reflections during data collection would result in a substantial error in calculations dependent upon the reflection measurement. Therefore, it is desirable to collect reflections which are higher order than zero order. However, as illustrated in FIG. 3, higher order reflections represent a smaller intensity than previous-ordered reflections (e.g., as the order number of the reflection peak increases, the relative intensity of the peak decreases). Therefore, it is contemplated that at some point, higher order reflections (for example, third order or above) may be excluded from collection without causing substantial errors in metrology determinations.

Figure 4A:
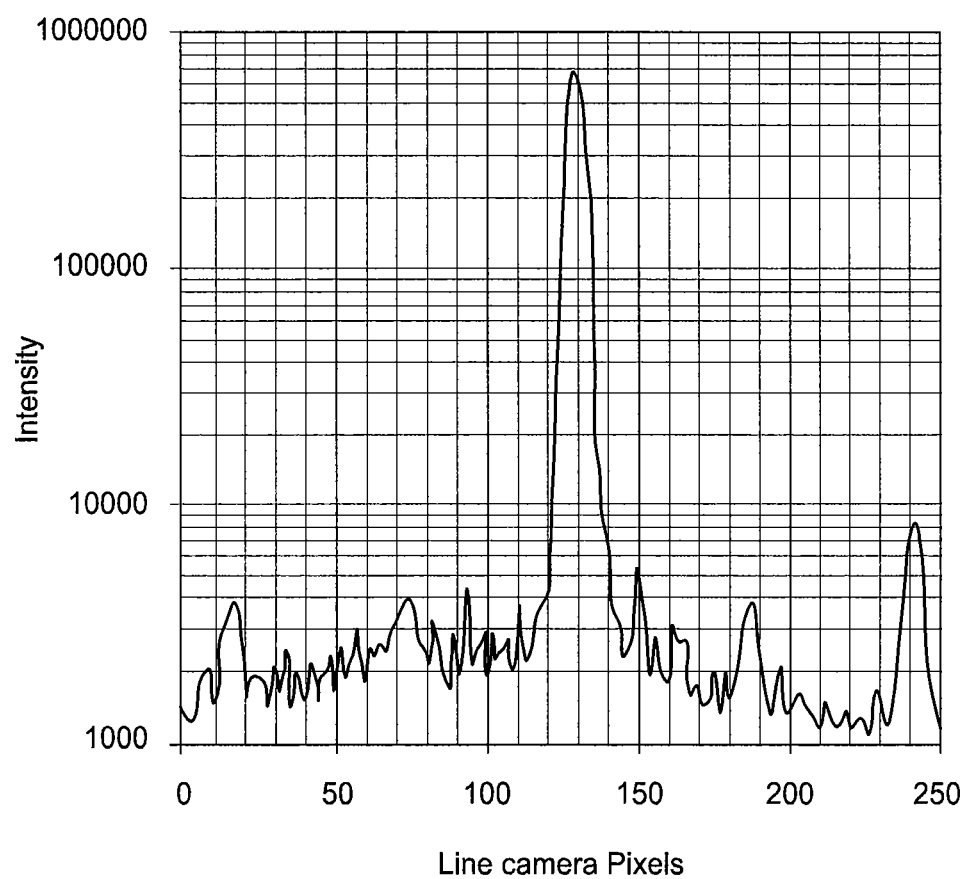
FIGS. 4A and 4B illustrate diffraction patterns captured using embodiments of the invention.
Figure 4B:
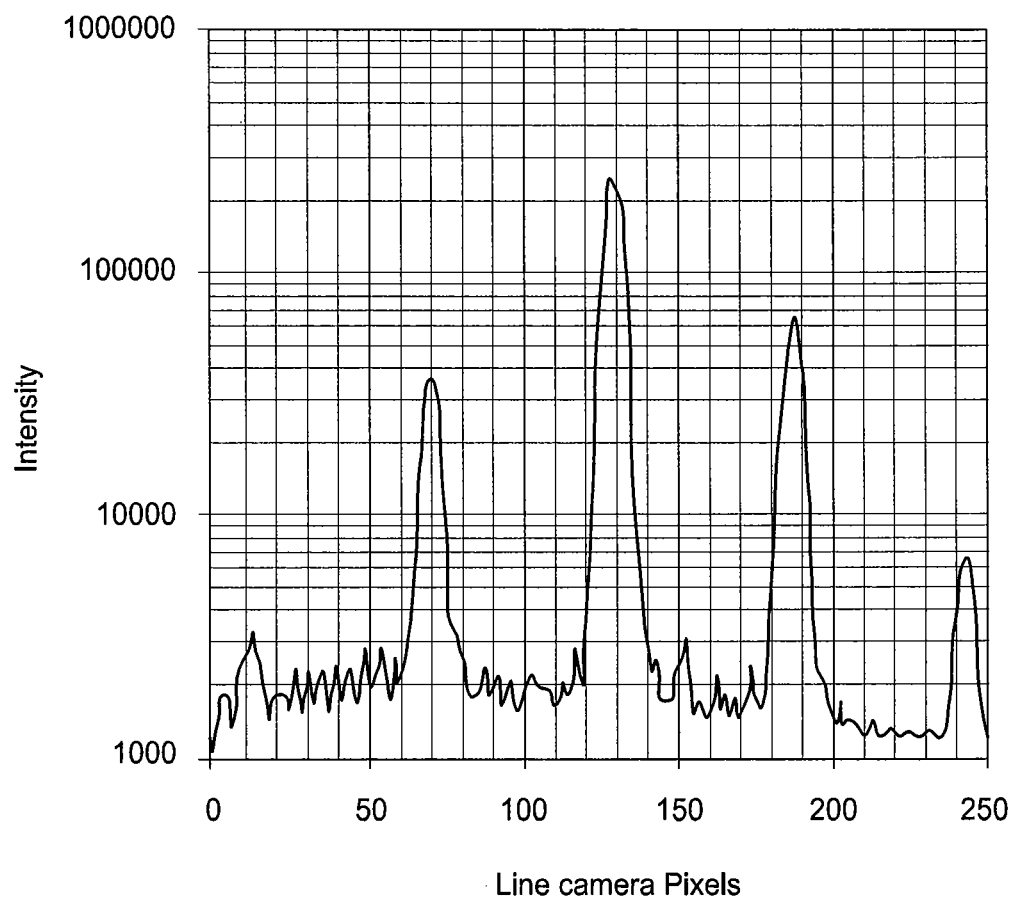

FIGS. 4A and 4B illustrate diffraction patterns captured using embodiments of the invention. The diffraction pattern 470A is generated from a silicon substrate having a plurality of trenches formed therein. The trenches are 2 micrometers apart and have a width of 0.2 micrometers and depth of 200 nanometers. The trenches are filled with silicon dioxide, and an amorphous silicon layer having a thickness of about 30 nanometers is deposited thereon. The substrate having the amorphous silicon layer deposited thereon is exposed to a laser annealing process. The laser annealing process utilizes a laser having a wavelength of 0.94 micrometers and a fluence of about 0.4 milliJoules per square centimeter. A reflection measurement system, similar to that shown in FIG. 1, was utilized to collect the diffraction pattern 470A. Due to the substantially two-dimensional or planar surface of the amorphous silicon, the diffraction pattern includes substantially only a zero order peak.

The diffraction pattern 470B is generated from a similar substrate described with respect to FIG. 4A. The substrate includes an amorphous silicon layer thereon which is exposed to an annealing process utilizing a laser having a wavelength of 0.94 micrometers and a fluence of about 0.5 milliJoules per square centimeter. At a fluence of about 0.5 milliJoules per square centimeter, the laser has sufficient energy to induce crystallization of the amorphous silicon. The crystallized portions of the amorphous silicon allow some light to pass therethrough. Thus, when a reflection measurement system collects reflection data from the substrate, first and second order peaks are recorded in addition to a zero order peak. The first and second order peaks are generated by the underlying trenches due to light reflecting therefrom after penetrating the transparent portions of the crystallized silicon. Thus, it is to be noted that collection of higher order diffraction peaks for metrology purposes may be desirable even when processing substrates having a two dimensional surface thereon. Moreover, it should be noted that the reflection of light from a substrate surface may change as the substrate is processed, and thus, while higher order peaks may not initially be present, higher order peaks may develop as processing proceeds.

Benefits of the present invention include accurate measurement of substrate emissivity for accurate non-contact measurement of substrate temperature. The apparatus and methods utilize a focus lens to collect light reflected from the substrate which has been scattered due to the presence of 3D structures on a substrate surface. The focus lens maximizes the amount of reflected light collected to ensure an accurate determination of the substrate emissivity, thereby providing a more accurate determination of temperature. The focus lens is particularly useful for substrates with 3D features on a surface thereof. The 3D features cause increased scattering and interference of the reflected light, thus reducing or eliminating the specular reflection of the light commonly associate with planar substrates. The increased scattering may result in up to 80 percent of the reflect light being non-specular. However, the focus lens described herein allows for the scattered light to be collected and provided to a sensor to facilitated accurate measurement of the substrate emissivity. Thus, the accuracy of measurements of reflected light are greatly increased using embodiments described herein.

While the foregoing is directed to embodiments of the present invention, other and further embodiments of the invention may be devised without departing from the basic scope thereof, and the scope thereof is determined by the claims that follow.

We claim:

1. An apparatus, comprising:
    a chamber body;
    a substrate support positioned within the chamber body;
    a laser for directing light to a substrate supported on the substrate support for thermally processing the substrate;
    a reflection measurement system positioned within the chamber body, the reflection measurement system including:
        an emissometer;
        an imaging device;
        a light source positioned to direct light towards the substrate support, the light source generating light at a different wavelength than the laser;
        a focus lens positioned to collect light reflected from the surface of the substrate placed on the substrate support, the focus lens positioned at a specular angle of reflection relative to the light source; and
        a beam splitter positioned to direct a first portion of the light collected by the focus lens to the emissometer which determines an emissivity of the substrate, and to direct a second portion of the light collected by the focus lens to the imaging device for generating a magnified image of a diffraction pattern of the light reflected from the surface of the substrate; and
    a processing unit to determine a temperature of the substrate based upon the emissivity of the substrate.

2. The apparatus of claim 1, wherein the light source is a monochromatic light source.

3. The apparatus of claim 1, wherein the imaging device is a CCD camera.

4. The apparatus of claim 1, wherein the laser and the light source are adapted to simultaneously direct light to the same area of the substrate support.

5. The apparatus of claim 1, wherein the reflection measurement system is located in a fixed position within the chamber body.

6. The apparatus of claim 5, wherein the substrate support is translatable in the X-Y directions relative to the reflection measurement system.

7. The apparatus of claim 1, wherein the beam splitter is positioned near the back focal plane of the focus lens.

8. The apparatus of claim 1, wherein the imaging device is positioned along a common axis with respect to the beam splitter and the focus lens.

9. The apparatus of claim 1, wherein the light from the laser and the light from the light source are directed to an overlapping area of the substrate.

* * * * *